United States Patent [19]

Kushida et al.

[11] Patent Number: 5,119,794
[45] Date of Patent: Jun. 9, 1992

[54] FUEL HEATER FOR INTERNAL COMBUSTION ENGINES

[75] Inventors: Osami Kushida; Takahisa Yamashita, both of Gotenba; Yasushi Hibino, Shizuoka, all of Japan

[73] Assignee: Texas Instruments Incorporated, Dallas, Tex.

[21] Appl. No.: 738,999

[22] Filed: Aug. 1, 1991

[30] Foreign Application Priority Data

Aug. 17, 1990 [JP] Japan ................. 2-216699

[51] Int. Cl.⁵ ................ F02M 31/00; F02M 31/125
[52] U.S. Cl. ........................... 123/549; 123/557; 123/543; 123/547
[58] Field of Search ............ 123/549, 557, 545, 547, 123/543, 552, 575

[56] References Cited

U.S. PATENT DOCUMENTS

| | | | |
|---|---|---|---|
| 3,306,273 | 2/1967 | Dolphin | 123/549 |
| 3,787,037 | 1/1974 | Motooka | 123/549 |
| 3,868,939 | 3/1975 | Friese et al. | 123/549 |
| 3,930,477 | 1/1976 | Jordan | 123/549 |
| 4,056,495 | 10/1991 | Yamashita et al. | 123/557 |
| 4,343,283 | 8/1982 | Shepherd | 123/557 |

Primary Examiner—Willis R. Wolfe
Assistant Examiner—M. Macy
Attorney, Agent, or Firm—Russell E. Baumann; Richard L. Donaldson; Renë E. Grossman

[57] ABSTRACT

This invention relates to a fuel heating device for internal combustion engines, in which both fuel heating means and fuel conductance passage are accommodated in the main body, constructed in such a manner that the fuel is injected after being heated while it passes the aforementioned fuel conductive passage to be arranged proximate to the combustion chamber of the internal combustion engine.

14 Claims, 6 Drawing Sheets

FUEL HEATER FOR INTERNAL COMBUSTION ENGINES

This invention relates generally to internal combustion engines and more specifically to fuel heating devices for use in such engines.

In conventional spark ignition internal combustion engines such as the gasoline engine, for example, a carburetor is employed for the purpose of mixing gasoline with an air intake to be supplied to the combustion chamber. The carburetor atomizes the gasoline by utilizing negative pressure inside the engine and supplies a suitable amount of air automatically, as the necessity arises, thereby making a combustible gas (mixed gas).

By way of explanation, with reference to FIG. 7, a throttle body 51 is formed as a venturi pipe with the diameter of its internal surface being reduced. The gasoline in a float chamber (which is not shown in the drawings) is atomized at the tip of a nozzle 55 by air 52 that has been supplied from its air supply hole through a choke valve 53. This mixed gas (MG) between the atomized gasoline and air is preliminarily heated through a honeycomb heater 57 from the carburetor via a butterfly valve 54 and is led to the combustion chamber of the engine (neither of these are shown in the drawings) through the branch pipe of an air intake manifold 5.

The throttle body 51 and air intake manifold 5 are air-tightly integrated by sandwiching an insulator that surrounds the honeycomb 57 via a gasket 59. A large number of gas passageways 57a are compactly formed in the honeycomb heater 57 and, as the heater itself is made electrically conductive, the mixed gas that passes is heated to a prescribed temperature so as to prevent knocking and economize the amount of the fuel consumed.

In the manifold 5, a warm water passage 5e passes the cold water that has been warmed by passing through the water-cooling jacket around a cylinder line that is not shown in the drawing. The honeycomb heater 57 is ordinarily constructed so as to stop being electrically conductive when the temperature of the cooling water rises to a selected level (such as to the temperature of 70 degrees centigrade) so as to save electricity from the battery.

In the case of passenger automobiles, in particular, use of a fuel injector is spreading widely in the place of a carburetor in recent years. The fuel injector atomizes and injects the gasoline on a positive basis without relying upon the negative pressure inside the engine and can be arranged proximate to the combustion chamber, with a result that it becomes possible to achieve liquefaction of the fuel at low ambient temperatures, a reduction of the heater current and bring about a near ideal combustion, thereby cleaning the discharged air.

The electron-controlled fuel injection system which detects the amount of the air intake by a sensor and controls the amount of gasoline injected by a computer, in particular, has the advantage of supplying the mixed gas under optimal conditions at all times.

FIG. 8 through 10 show the essential portion of an engine with a fuel injector provided therein. FIG. 8 shows a cross section of an air intake manifold (a cross section at line VIII—VIII in FIG. 9), FIG. 9 is a partial cross section of an air intake manifold and cylinder head (a cross section at line IX—IX in FIG. 8) and FIG. 10 is a cross section at line X—X in FIG. 9.

In this example, a fuel injector 7 is provided for each branch pipe 5a of the air intake manifold and a heat discharge plate 65 is arranged in the cylinder head 65 in such a manner as to oppose a fuel injector 7. The heat discharge plate 65 has a ceramic PTC (positive temperature coefficient) element 68 such as doped barium titanate, etc., with fins being erected thereon; it is fixed to the flange part 5c of the manifold branch pipe 5a.

In the drawing, numeral 6 indicates a gasket, and 70 is the terminal of the PTC element 68. The PTC elements 68 are electrically isolated from each other by means of an insulator 71.

The atomized MG that has been injected from the fuel injector 7 is heated as it hits the heat discharge plate 65 and is supplied to a combustion chamber which is not shown in the drawing. The aforementioned system wherein a fuel injector is arranged for each manifold branch pipe is called the MPI (multiple point injection) system.

FIG. 11 is a cross section of an air intake manifold according to another embodiment (a cross section at line XI—XI in FIG. 12), FIG. 12 is a cross section cut along line XII—XII in FIG. 11 and FIG. 13 shows the bottom at line VIII—XIII in FIG. 12.

In this example, an opening 5f is provided in the throttle chamber 5b immediately before the branch part of the air intake manifold 5 and a fuel heater is arranged, with a fuel injector 7 for cold ambient usage being installed toward the heater.

When cold, the atomized gasoline MG is injected from the fuel injector 7 in cooperation with the fuel injector shown in FIG. 9 and this atomized gasoline MG is heated by the heat discharge plate 75, to be sent to the manifold branch pipe 5a.

The heat discharge plate 75 has a structure in which a PTC element 78 is provided in such a manner as to face the insulating plate 81B, with a large number of fins 77 being provided. The plate is fixed to the air intake manifold 5 through an insulator 81A. In the drawing, numeral 79 indicates a sheet spring and 80 is the terminal of a PTC element.

When cold, the atomized gasoline that has been injected from the carburetor becomes liquid drops as it contacts the manifold and flows down the inner wall of the manifold; however, it is heated by the heat discharge plate 75 and evaporated.

In this manner, a single injector for cold use is provided in the air intake manifold which is unsuitable for use with a compound (a mixture of gasoline and methanol or methanol or gasoline 100%) fuel engine.

However, due to a demand for clean waste gas and in view of concern about the oil supply in recent years leave in a gasoline-alcohol mixed fuel (with the ratio of gasoline to alcohol being 15 : 85, to cite an example) obtained by mixing an alcohol such as ethanol or methanol without relying on the gasoline alone has come under consideration. Mixed fuel of gasoline and alcohol (which will hereafter be called the alcohol-containing fuel) is already being put to use in Brazil, and may come into widespread use in the United States in the near future.

However, the alcohol-containing fuel has inherent problems such as the low theoretical air-fuel cost in the range between 6.5 and 9.0 units as compared with 14.7 units for the gasoline because the combustion of alcohol is chemical equivalent combustion and an increase in the latent heat of evaporation of alcohol. Due to an increase in the amount of fuel injected and an increase in heat necessary for evaporation, failure of engine start at low ambient temperature becomes a problem as well as producing an increase in the harmful ingredients in the exhaust gas.

Because of the above, failure of engine start-up at low temperatures tends to take place more frequently than when gasoline alone is used as the fuel for the reasons described above. In the case where the alcohol-containing fuel is employed, in particular, the heat calories required by the fuel are large and the size of the heat discharge plate becomes larger for the required heat conductance, with a consequence that the loss of air intake pressure becomes greater and electric power consumed for heating increases.

SUMMARY OF THE INVENTION

The object of this invention is to provide a fuel heating device for internal combustion engines, where the regular operation of the internal combustion engines is assured at all times irrespective of such external environments as the fuel and temperature, etc. that are used.

Briefly in accordance with the invention, a PTC heater block is mounted on an inner wall of a gas passage. The heater has branched fuel passages through which a liquid fuel is supplied and then vaporized by the heat of the heater so as to inject from the openings of respective passages. This vaporized fuel gas is joined to a fuel gas from a fuel injector. Therefore, even if the fuel applied contains an alcohol, the heater can efficiently heat the fuel without being influenced by the heat of vaporization of the alcohol so as to assist the atomization of the fuel.

BRIEF DESCRIPTION OF THE DRAWINGS

FIG. 1 is a partial cross section of a gasoline engine.

FIG. 2 is a cross section of the essential portion, taken along line II—II in FIG. 1.

FIG. 3 is a cross section taken along line III—III in FIG. 1.

FIGS. 4 through 6 show the air intake manifold portion of a gasoline engine according to some other embodiments, with FIG. 4 showing a cross section taken along line IV—IV in FIG. 5, FIG. 5 showing a cross section taken along line V—V in FIG. 4 and FIG. 6 showing a cross section taken along line VI—VI in FIG. 5.

FIG. 8 shows a cross section taken along line VIII—VIII in FIG. 9, FIG. 9 shows a cross section taken along line IX—IX in FIG. 8 and FIG. 10 shows a cross section taken along line X—X in FIG. 9.

FIGS. 11 through 13 show the air intake manifold portion of a gasoline engine according to some other examples. FIG. 11 shows a cross section taken along line XI—XI in FIG. 12, FIG. 12 showing a cross section taken along line XII—XII in FIG. 11 and FIG. 13 showing a cross section taken along line XIII—XIII in FIG. 12.

Figure 1:
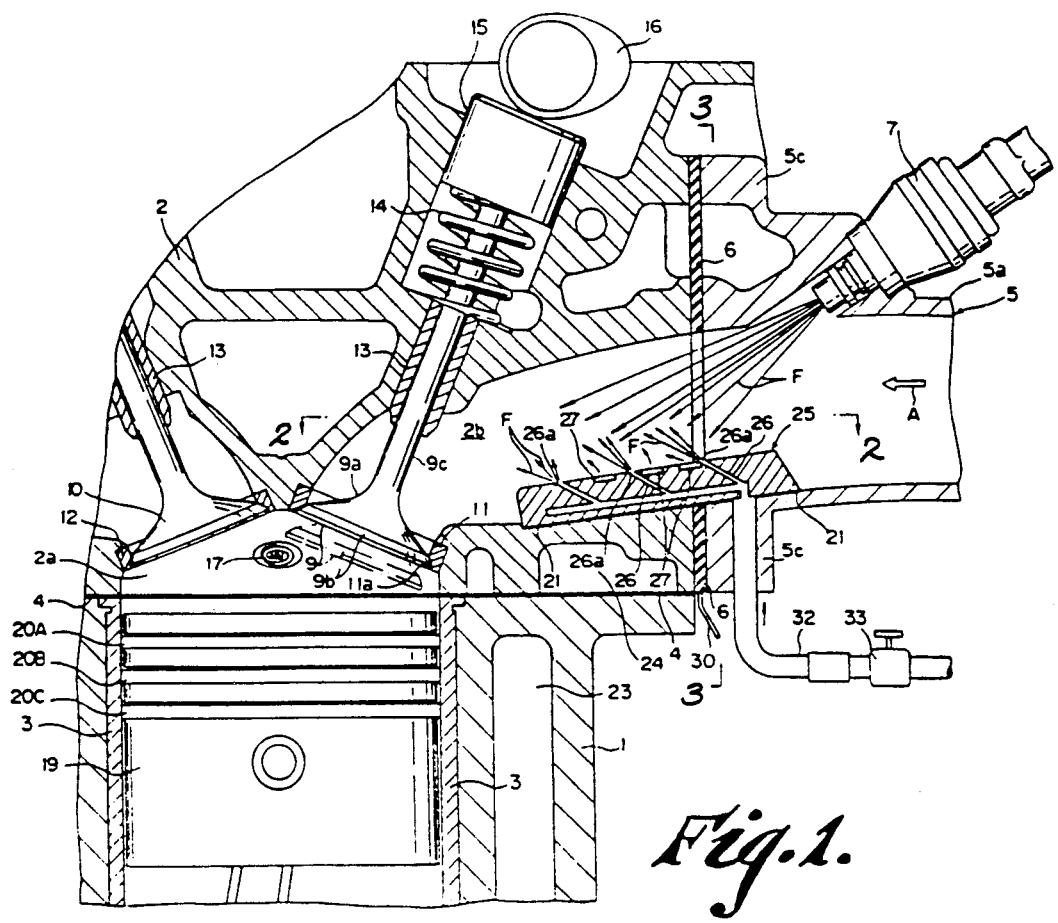
FIGS. 1 through 6 show embodiments made in accordance with this invention.

In the reference numerals shown in the drawings, 1 indicates a cylinder block, 2 is a cylinder head, 2a is a combustion chamber, 2b is a mixed gas passageway, 3 is a cylinder liner, 5 is an air intake manifold, 5a is a branch pipe, 5b is an air intake manifold, 5a is a branch pipe, 5b is a throttle chamber, 5c is a flange part, 7 is a fuel injector, 9 is an air intake pipe, 17 is an ignition plug, 19 is a piston, 25, 35, 65 and 75 are heat discharge plates, 26 and 36 are fuel passageways, 26a and 36a are the openings or orifices of the fuel passageways, 28 and 38 are PTC elements, 32 and 42 are fuel supply pipes, 33 and 43 are electromagnetic valves, 56 is a carburetor, 57 is a honeycomb heater, F is an atomized fuel, and MG is an atomized gasoline.

DETAILED DESCRIPTION OF THE PREFERRED EMBODIMENTS

In the first embodiment the invention is shown incorporated into an engine of the MPI system.

FIG. 1 shows an expanded cross section of the periphery of the combustion chamber of a gasoline engine of the double overhead cam-shaft (DOHC) system. It is mentioned in this connection that those parts which are in common with the FIGS. 8 through 13 are given the same numerals. (The same will hold true thereafter.)

A cylinder head 2 is fixed on the cylinder block 1 through a gasket 4. Cylinder head 2 is made of an aluminum alloy and is grounded. Into the valve guides 13 and 13 that are pressed into the cylinder head 2, an air intake valve 9 and an air discharge valve 10 are inserted in such a manner as to permit free motion. It contacts an air intake valve ring 11 and an air exhaust valve ring 12 respectively.

In the drawing, numeral 9a indicates a valve head, 9b is a valve face, and 9c is a valve stem. The air intake valve 9 is provided with spring 14 for return force and contacts the cam shaft 16 through a tappet 15. An exhaust valve 10 is installed on the cylinder head 2 by the same mechanism as the air intake valve 9; however, this is not shown in the drawing.

A piston 19 is inserted into a cylinder liner 3 that has been inserted into a cylinder block 1, is sealed by the first pressure ring 20A and the second pressure ring 20B and the lubrication of the lubricant oil is controlled by an oil scraping ring 20C.

Outside the cylinder liner 3, a cold water jacket 23 is formed and the cylinder liner 3 is prevented from being excessively heated by water cooling. The cooling water that has been used for cooling purposes is led to a warm water jacket 24 so as to warm the lower side of the intake port of the cylinder head 2.

An air intake manifold 5 is installed on the cylinder head 2 through a gasket 6 and an injector 7 is fixed to the branch pipe 5a of the air intake manifold 5.

A heat discharge plate 25 is installed at the flange part 5c of the air intake manifold 5, most of the heat discharge plate 25 enters the bottom of the mixed gas passage 2b of the cylinder head 2 and is isolated from the flange part 5c and the cylinder head 2 by a thermal insulating packing 21, thereby preventing the heat from conducting to these parts.

A fuel passageway 26 is provided in the heat discharge plate 25 and the fuel passageway 26, that runs through the air intake manifold flange part 5c, is connected to a fuel supply pipe 32 and an electromagnetic valve 33.

The injector 7 and the heat discharge plate 25 receive a supply of fuel from a common fuel supply source (a fuel tank). At the normal time (when warm), the fuel is injected from the injector 7 alone and, when cold, the fuel is injected from both the injector 7 and the fuel passageway 26. The alcohol-containing fuel (with the gasoline vs. methanol ratio being 15 : 85 in this example)

F that has been introduced into the fuel passageway 26 through an electromagnetic valve 33 and a fuel supply pipe 32 is heated by the PTC element which will be explained later on the basis of FIGS. 2 and 3 and is injected from the tip opening or orifice 26a of the fuel passageway 26 into the mixed gas passage 2b.

In the drawing, numeral 2a indicates a combustion chamber and 17 is an ignition plug.

Figure 2:
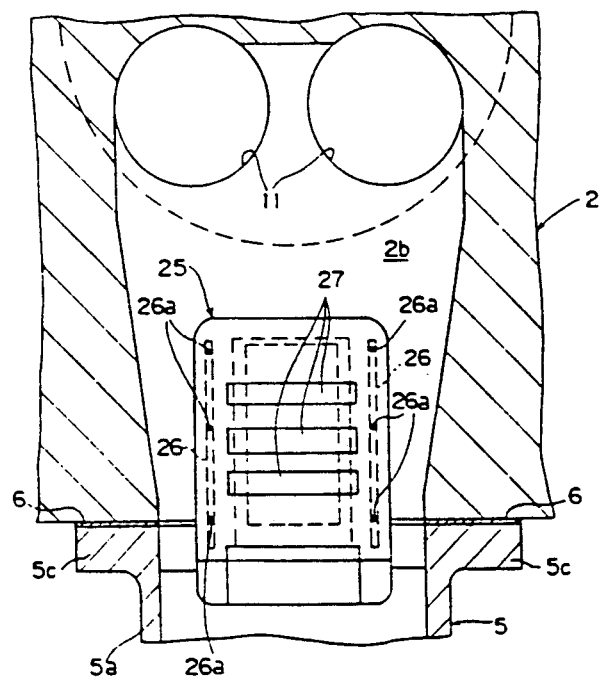
Figure 3:
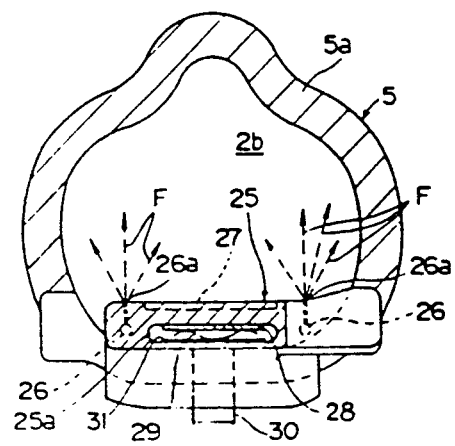

As is shown in FIG. 1 and in FIG. 2 which is a cross section taken along line II—II FIG. 1, a fuel recess 27 is provided on the surface of the heat discharge plate 25 and the alcohol-containing fuel F which is injected from the injector 7 is once pooled at the fuel recess 27 and is evaporated as it is heated by the heat of the heat discharge plate 25.

Because of the above, the alcohol-containing fuel coming from the injector 7 is not instantaneously reflected from the heat discharge plate 25 but is satisfactorily heated and evaporated as described above.

It is mentioned in this connection that the surroundings of the air exhaust valve ring 11 in FIG. 2 are simplified.

The electrical structure of the heat discharge plate 25 will be explained on the basis of FIG. 3 which is a cross section cut along line III—III in FIG. 1. The PTC element 28 is contacted to and installed in a cavity 25a in the heat discharge plate by means of a sheet spring 29 that has been installed on the insulator 31 in such a manner as to be pressed upwardly. An extension protrudes from the sheet spring 29 and extends therefrom constitutes the terminal 30 of the PTC element. Electricity is supplied to the PTC element from the terminal 30 through the sheet spring 29 and its temperature is elevated. Since the resistance of the PTC element 28 increases because of the elevated temperature, it will not be over-heated and has durability.

As has been described above, the alcohol-containing fuel that is injected from the injector 7 contacts the heat discharge plate 25, thereby being sufficiently heated, and, inasmuch as the alcohol-containing fuel that passes inside the heat discharge plate 25 is sufficiently heated by the PTC element and, its atomization being promoted at high efficiency by the evaporation latent heat of the alcohol, the atomized alcohol-containing fuel is completely combusted, the engine operation during low temperature conditions is stabilized and the harmful ingredients in the exhaust gas are reduced.

Inasmuch as it is the fuel alone that heats by the heat discharge plate, the heating efficiency is high and, accordingly, the fuel can be reduced. Since no fins are required, further, the heat discharge plate can be made small, thereby reducing the loss of air intake pressure and reducing the electric power that is required for heating by the PTC element.

It is also possible to provide a cold injector for cold use in the injector 7 so that fuel injector for cold use may be used only at the cold time. Otherwise, the injector 7 may be made larger-sized so as to cope with the normal and cold-time operation.

It is also possible to bury the heat discharge plate 25 into the cylinder head 2 so as to make the surface of the heat discharge plate as a smooth continuation of the bottom of the cylinder head 2.

The atomized alcohol-containing fuel F that has been injected from the injector 7 is heated as it hits the heat discharge plate 25 as described earlier and, in addition, is conditioned in such a fashion as to move to the combustion chamber 2a along with the intake air (or mixed gas) A. Therefore, it will not contact the surface of the intake port wall of the cylinder head 2. Even if the cylinder head is cold at the time of the start-up, therefore, dew condensation does not take place and a prescribed amount of the alcohol-containing fuel is supplied to the combustion chamber irrespective of the temperature of the cylinder head.

Since the amount of the alcohol-containing fuel and the intake air are controlled by a computer in conformity with the engine operating conditions, an optimal mixed gas supply corresponding to the conditions of the engine at each time point is carried out, with a result that ideal driving is assured.

The alcohol content in the fuel is 85 per cent and, since the alcohol is completely burned and becomes water and carbon dioxide, the amount of the undesired impurities in the exhaust gas will be small, with a consequence that the exhaust gas becomes clean.

In accordance with a second embodiment the invention is incorporated into an engine equipped with a cold start injector in a Flexible Fuel Vehicle (F.F.V.).

In this embodiment, a second cold start injector is installed along with the injector 7 which is shown in FIG. 1 and a heat discharge plate having a structure which is different from manifold branch pipe 5a but inside a throttle chamber (which will be explained later in connection with FIGS. 4 through 6) immediately before the branch pipe of the air intake manifold 5. In addition, the throttle chamber is connected with the manifold 5.

Figure 4:
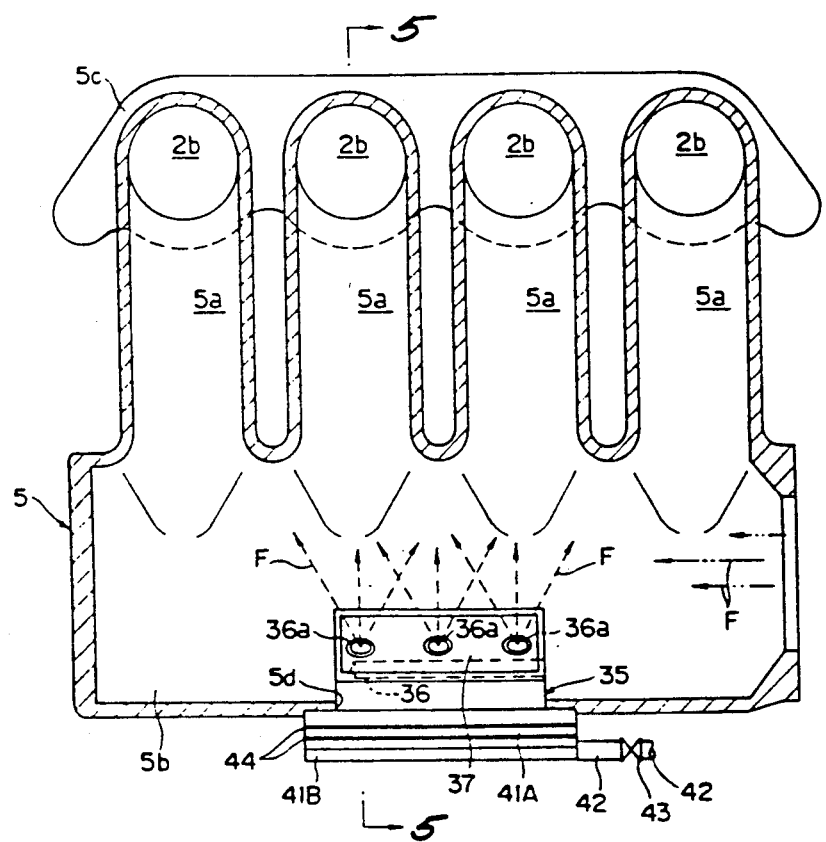
Figure 5:
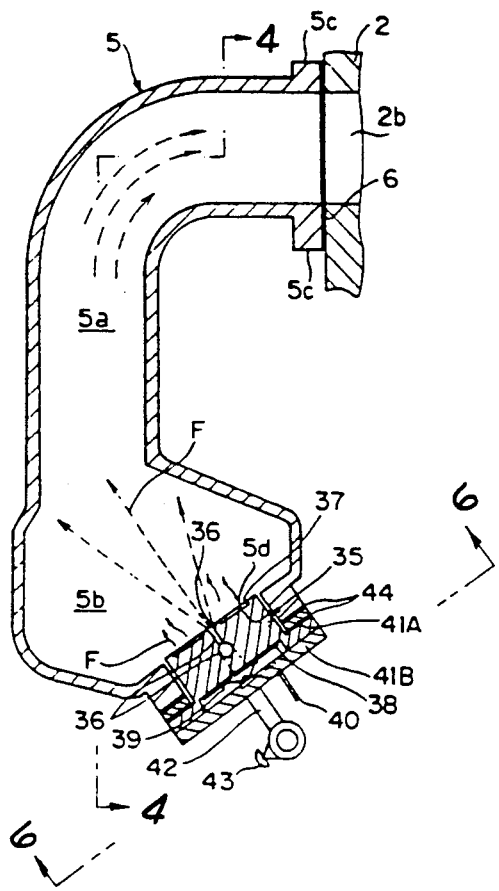

FIGS. 4 and 5 are cross sections of the air intake manifold, with FIG. 4 showing the cross section taken along line IV—IV in FIG. 5 and FIG. 5 showing the cross section taken along line V—V in FIG. 4.

Figure 6:
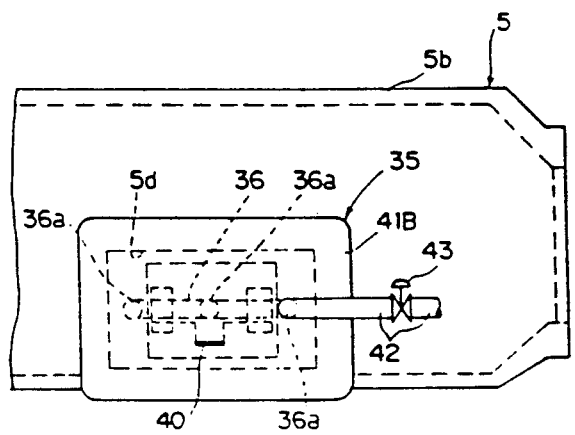

FIG. 6 indicates the bottom on line VI—VI in FIG. 5.

An opening 5d is provided in the throttle chamber 5b immediately before the branch pipe 5a of the air intake manifold 5 and a heat discharge plate 35 is installed in the opening 5d through a gasket 44, a first insulator 41A and a gasket 44. A fuel passageway 36 is provided inside the heat discharge plate 35 and the fuel passageway 36 which runs through an insulating plate (second insulator) 41B that has been installed on the lower side of the heat discharge plate 35 is linked to a fuel supply pipe 42 and an electromagnetic valve 43.

Figure 7:
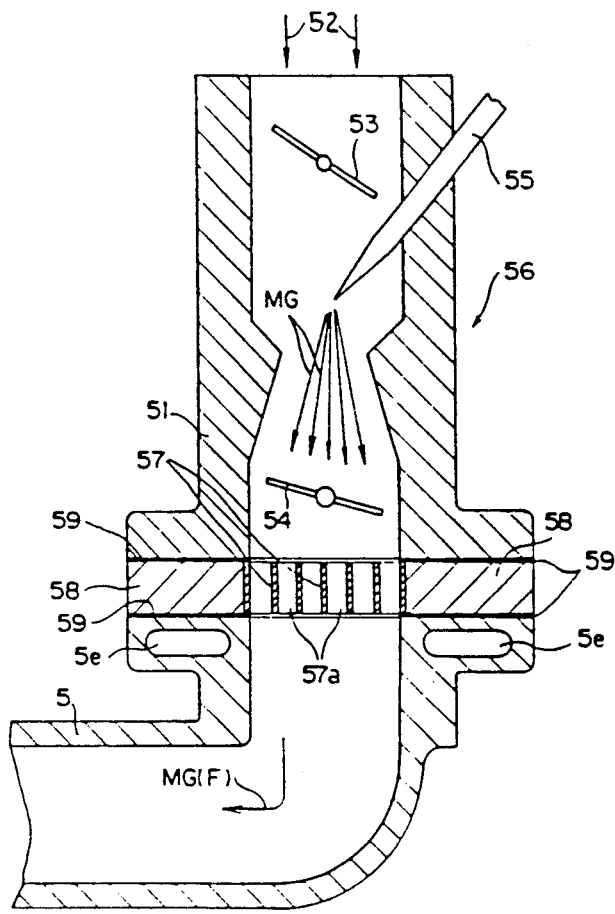
FIGS. 7 through 13 show conventional prior art examples, with FIG. 7 showing a rough cross section of a carburetor and its environment, FIGS. 8 through 10 showing the essential portion of a gasoline engine.
Figure 8:
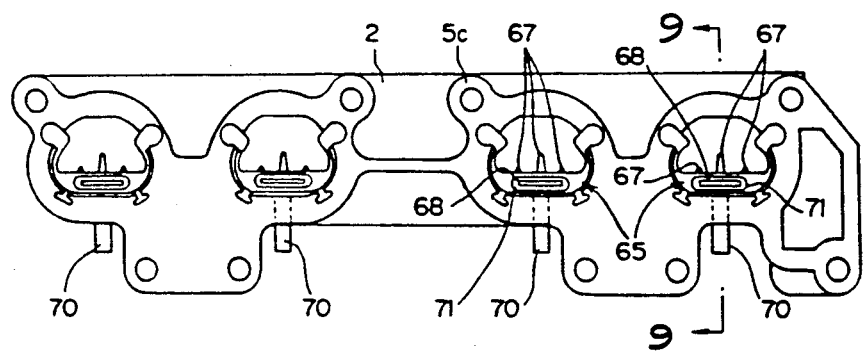
Figure 9:
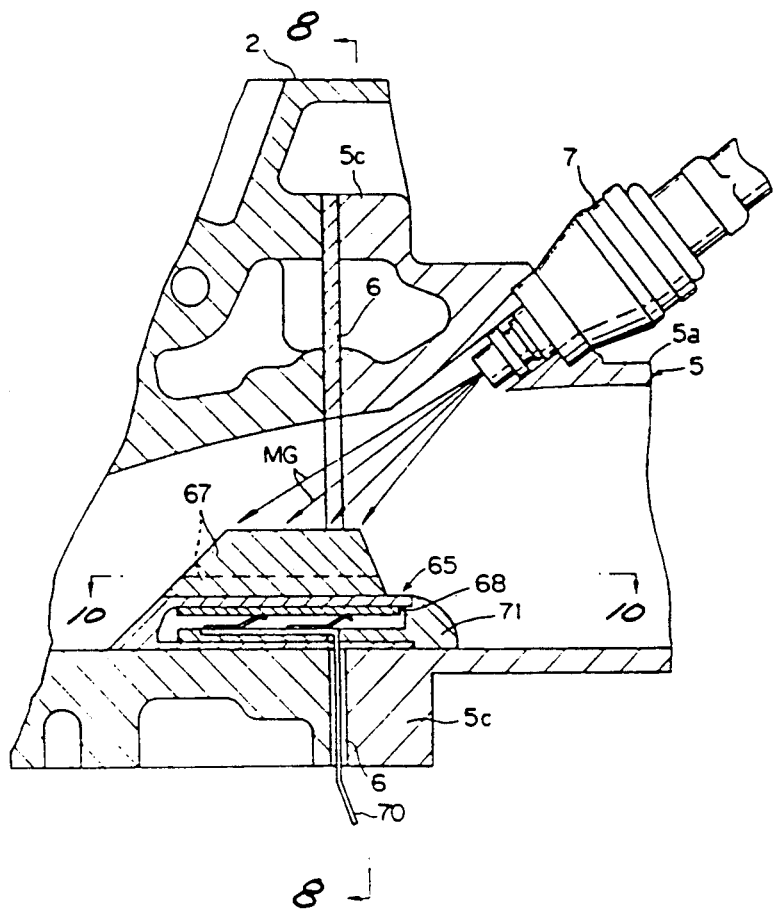
Figure 10:
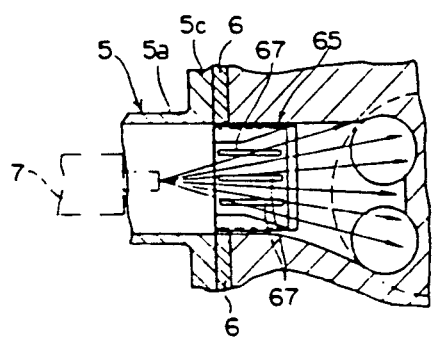
Figure 11:
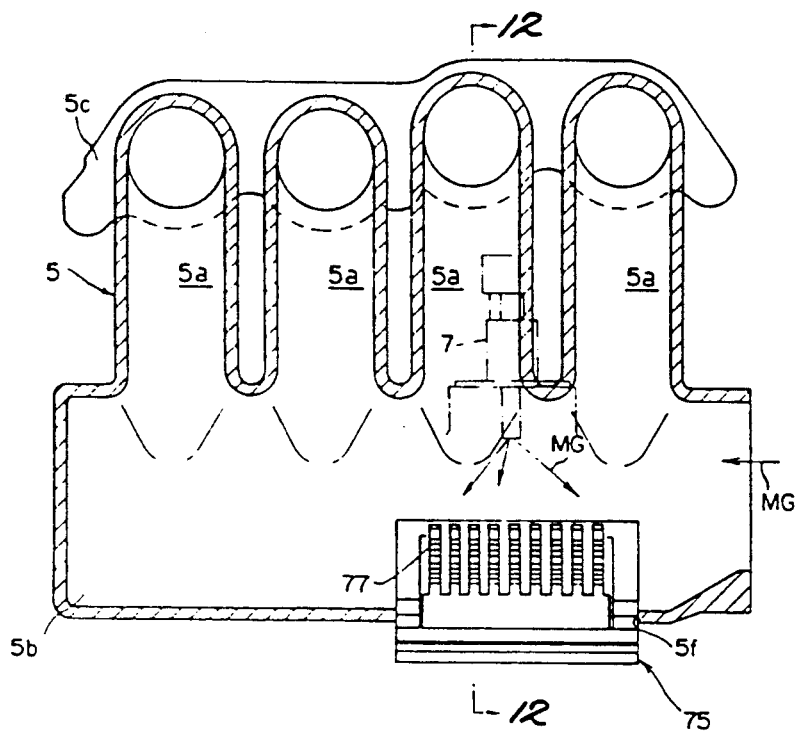
Figure 12:
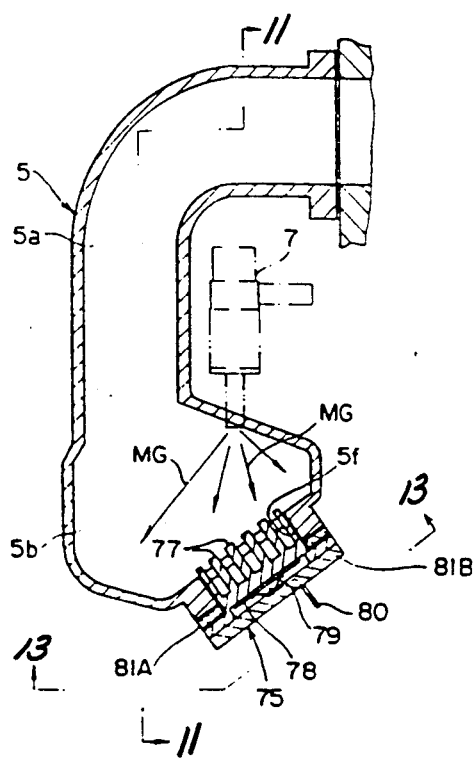
Figure 13:
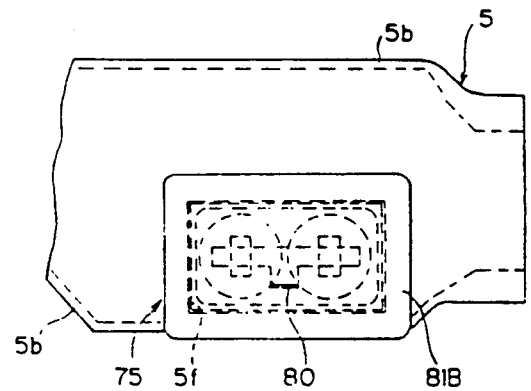

The carburetor 56 and heat discharge plate 35 in FIG. 7 receive a supply of fuel from the common fuel tank. On the insulating plate 41B, the PTC element 38 is installed in such a manner as to be pressed to the heat discharge plate 35 through a sheet spring 39 and a extension extends from the sheet spring 39 through the insulating plate 41B sticks out, thereby forming the terminal 40 of the PTC element.

A fuel recess 37 is formed on the surface of the heat discharge plate 35 so as to pool the atomized fuel from the carburetor that flows down after being condensed on the inner wall of the manifold, followed by the evaporation thereof by the heat of the PTC element. At the time when it is cold, the alcohol-containing fuel F is blown toward the manifold branch pipe 5a from the opening or orifice 36a of the fuel passageway 36 along with the alcohol-containing fuel injection from the carburetor 56 shown in FIG. 7.

In this embodiment, an effect which is approximately the same as in Example 1 shown above is achieved. As compared with Example 1, however, the cost of manufacturing the engine is lower.

Even in the case where the gasoline alone is used as the fuel, the acceleration at the start-up can be improved both in Examples 1 and 2 shown above. It is also possible to increase the heat discharge effect by providing fins on the surfaces of the heat discharge plates 25 and 35.

The various examples shown above all involve a four-cycle engine; however, the same effect can be achieved by providing a fuel heating device (heat discharge plate) based on this invention inside the liaison pipe that connects the crank case and the combustion chamber of a two-cycle engine.

In addition, this invention can similarly be used in a rotary piston engine and diesel engine, too. Moreover, the intake air can be oxygen-enriched air. The shape, structure and material, etc. of the heating element described above can be modified and the heater element to be used may be something other than the PTC element (provided that same is an electrical heater element).

The fuel heating device for internal combustion engines according to this invention is arranged proximate to the combustion chamber of the internal combustion engine and possesses both fuel heating means and fuel passageway means. Even if a mixed fuel is used containing a fuel component whose latent heat of evaporation is high (such as alcohol), the fuel is heated by the fuel heating means and sent immediately to the combustion chamber, with a result that the atomization is effectively facilitated and the fuel is completely burned in response to the aforementioned latent heat of evaporation.

Moreover, the fuel is heated by the aforementioned fuel heating means and, even if it may be cold as at the start-up, the operation of the internal combustion engine becomes accurate.

Thus, it becomes possible to drive the internal combustion engine normally at all times irrespective of such external environmental factors as the kind of the fuel used and the temperature, etc. and clean the exhaust gas by a fuel ingredient that does not produce harmful components after combustion as in the case of alcohol, to cite an example.

It will be apparent to those skilled in the art that variations on the structure described can be made to accomplish essentially the same purpose. All such variations within the scope of the claims are intended to be within the scope and spirit of the present invention.

We claim:

1. An internal combustion engine comprising a cylinder block, a combustion chamber, a cylinder head, an air intake valve, an air intake manifold, a mixed gas passageway communicating between the air intake manifold and the air intake valve, first fuel supply means, fuel atomizing means for atomizing fuel from the first fuel supply means, means for heating fuel from the first fuel supply means disposed intermediate the fuel atomizing means and the air intake valve, a second fuel supply means, means for atomizing fuel from the second fuel supply means and means for heating fuel from the second fuel supply means prior to atomization.

2. An internal combustion engine according to claim 1 in which the means for heating fuel from the second fuel supply means comprises a plate having a top surface and an internal cavity, a heater disposed within the cavity to supply heat to the plate and fuel passageways disposed in the plate coupled to second fuel supply means and leading to orifices means in the top surface of the plate.

3. An internal combustion engine according to claim 2 in which the orifice means comprises a plurality of orifices.

4. An internal combustion engine according to claim 2 in which the heater comprises a PTC element.

5. An internal combustion engine according to claim 2 in which the means for heating fuel from the first supply means comprises the top surface of the plate.

6. An internal combustion engine according to claim 5 in which at least one recess is formed on the top surface of the plate.

7. An internal combustion engine according to claim 5 in which the fuel atomizing means for atomizing fuel from the first fuel supply comprises fuel injector means.

8. An internal combustion engine according to claim 5 in which the fuel atomizing means for atomizing fuel from the first fuel supply comprises carburetor means.

9. An internal combustion engine according to claim 3 including electromagnetic valve means coupled to the second fuel supply means adapted to cut off the supply of fuel from the second fuel supply means when the engine has reached a selected operating temperature.

10. An internal combustion engine according to claim 2 in which a portion of the plate is disposed in the mixed gas passageway.

11. An internal combustion engine according to claim 10 in which a portion of the plate is disposed in the air intake manifold.

12. An internal combustion engine according to claim 11 in which the majority of the plate is disposed in the mixed gas passageway.

13. An internal combustion engine according to claim 2 further including a throttle chamber and the plate is disposed in the throttle chamber.

14. A fuel heating device for internal combustion engines, to be arranged proximate to the combustion chamber of an internal combustion engine, having a main body, in which both heating means and a fuel passageway are accommodated inside the main body, with the fuel being blown out after being heated while it passes through the aforementioned fuel passageway.

* * * * *